(12) United States Patent
King et al.

(10) Patent No.: US 6,422,062 B1
(45) Date of Patent: Jul. 23, 2002

(54) INTEGRATED GLASS FOG SENSOR UNIT

(75) Inventors: Timothy O. King, Warren, OH (US); Thomas Martin Urbank, Lockport, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/650,131

(22) Filed: Aug. 29, 2000

(51) Int. Cl.[7] .............................. G01N 7/00; H05B 1/02; F24F 3/14
(52) U.S. Cl. ...................... 73/29.01; 73/335.05; 62/150
(58) Field of Search .................... 73/29.01, 29.04, 73/29.05, 335.02, 335.03, 335.04, 335.05, 335.07; 62/150, 176.1, 176.2; 340/602; 374/27, 28

(56) References Cited

U.S. PATENT DOCUMENTS

| | | | | |
|---|---|---|---|---|
| 4,408,660 A | * | 10/1983 | Sutoh et al. | 62/176.2 |
| 4,412,424 A | * | 11/1983 | Iida et al. | 62/150 |
| 4,910,967 A | * | 3/1990 | Takahashi | 62/176.1 |
| 5,325,912 A | * | 7/1994 | Hotta et al. | 165/204 |
| 5,511,417 A | * | 4/1996 | Paukkunen | 73/335.03 |
| 5,682,788 A | * | 11/1997 | Netzer | 73/29.01 |
| 5,701,752 A | * | 12/1997 | Tsunokawa et al. | 62/183 |
| 6,049,069 A | * | 4/2000 | Hochstein | 340/602 |
| 6,067,808 A | * | 5/2000 | Dage | 62/150 |
| 6,173,902 B1 | * | 1/2001 | Bauer et al. | 236/49.3 |

FOREIGN PATENT DOCUMENTS

JP 55142431 A * 11/1980 ................ 340/602

* cited by examiner

Primary Examiner—Hezron Williams
Assistant Examiner—Michael Cygan
(74) Attorney, Agent, or Firm—Thomas N. Twomey

(57) ABSTRACT

Described is an integrated glass fog sensor unit utilized to provide the necessary data to predict glass fog formation. The unit includes a glass surface temperature sensor, an ambient air temperature sensor, and a relative humidity sensor. The unit is mounted on a thermal barrier tray which serves to thermally isolate the ambient air temperature sensor and the relative humidity sensor from the glass surface. A protective dome having a plurality of apertures covers the tray and sensors. A flex circuit, also acting as a thermal barrier, is utilized to complete the circuit between the sensors and the fog control unit.

9 Claims, 2 Drawing Sheets

INTEGRATED GLASS FOG SENSOR UNIT

TECHNICAL FIELD

This invention relates to an automotive windshield fog sensor. More particularly, this invention relates to an integrated glass fog sensor unit terminated on a flex circuit.

BACKGROUND OF THE INVENTION

Windshield fog conditions are predicated on windshield surface temperature, ambient air temperature and ambient humidity within the occupant compartment. Dew-point is calculated from the ambient air temperature and ambient humidity. An indicator of fog entails the relationship of this dew-point with the windshield surface temperature.

A common instance of fogging occurs when a vehicle is initially cold prior to people entering. With people entering the vehicle compartment, the ambient air temperature and humidity increase. The windshield surface temperature remains cold and the air film about the surface is also cold. Since cold air can not contain as much moisture as warm air, it separates out and settles, in a liquid phase, on the cold windshield surface. Once the phase change occurs, from vapor to liquid, changing the liquid back to vapor takes a long time due to additional energy requirements necessary to achieve a phase change. For this reason, it is desirable to predict fogging before it occurs. Typical infrared fog sensing technology is capable of detecting the presence of fog, but not predicting fog before it occurs.

Instrumentation exists which can measure surface temperature, air temperature and air humidity, and if properly applied, can predict fogging on an automotive windshield as disclosed in U.S. Pat. No. 5,701,752 granted to Masaru Tsunokawa, Yukikatsu Ozaki, Chiryu Onimaru, and Takahisa Suzuki, Dec. 30, 1997.

The sensors required to predict fogging are typically placed individually within the vicinity of a glass surface, such as the vehicle compartment of a windshield. This placement often requires separate wire harnesses. The ambient air sensors are placed at a safe distance away from the windshield so that the cold glass surface does not interfere with the ambient air readings. That is, free space, or air, is typically relied on to provide the necessary thermal barrier between the glass surface temperature sensor and the ambient air sensors.

SUMMARY OF THE INVENTION

Accordingly, the present invention relates to an integrated glass fog sensor unit which serves to provide the necessary data to a fog control unit, such as that integrated into the heating, ventilation, and air conditioning control system, HVAC, of a vehicle. The unit is secured to an interior glass surface of a windshield by way of a tray having an adhesive layer backing. The unit has an ambient air temperature sensor, an ambient humidity sensor and a glass temperature sensor. The electrical connections are made by using a flex circuit. The ambient air temperature sensor is directly adjacent to the humidity sensor. The tray and the flex circuit also serve as a thermal barrier isolating the ambient air sensor and humidity sensor from the potentially cold glass surface. The glass temperature sensor sits within a hole, penetrating the tray and the flex circuit, so that the sensor is in direct contact with the glass surface. All three sensors are located beneath a protective dome which is secured to a perimeter wall of the tray.

The flex circuit has a conductor sensor end which conforms to the shape of a perimeter wall of the tray. This shape serves to limit movement of the flex circuit conductor sensor end thereby holding the sensors steady. The sensors are positioned to share a common ground.

Thus, an advantage of the present invention is a single fog sensor unit which is made possible by a combination of the tray and the flex circuit functioning as a thermal barrier, thereby reducing manufacturing costs.

Another advantage of the present invention is simplification of wiring by use of a common ground made possible by the centralization of the sensors necessary to predict fogging conditions, thereby reducing manufacturing costs.

Yet another advantage of the present invention is the use and shape of the flex circuit which conforms to the perimeter wall of the tray, thereby providing a simple, inexpensive, means to secure the flex circuit to the unit.

BRIEF DESCRIPTION OF THE DRAWINGS

These and other objects, advantages, and features of the present invention will be apparent to those skilled in the vehicle arts upon reading the following description with reference to the accompanying drawings, in which.

DESCRIPTION OF THE PREFERRED EMBODIMENT

Figure 1:
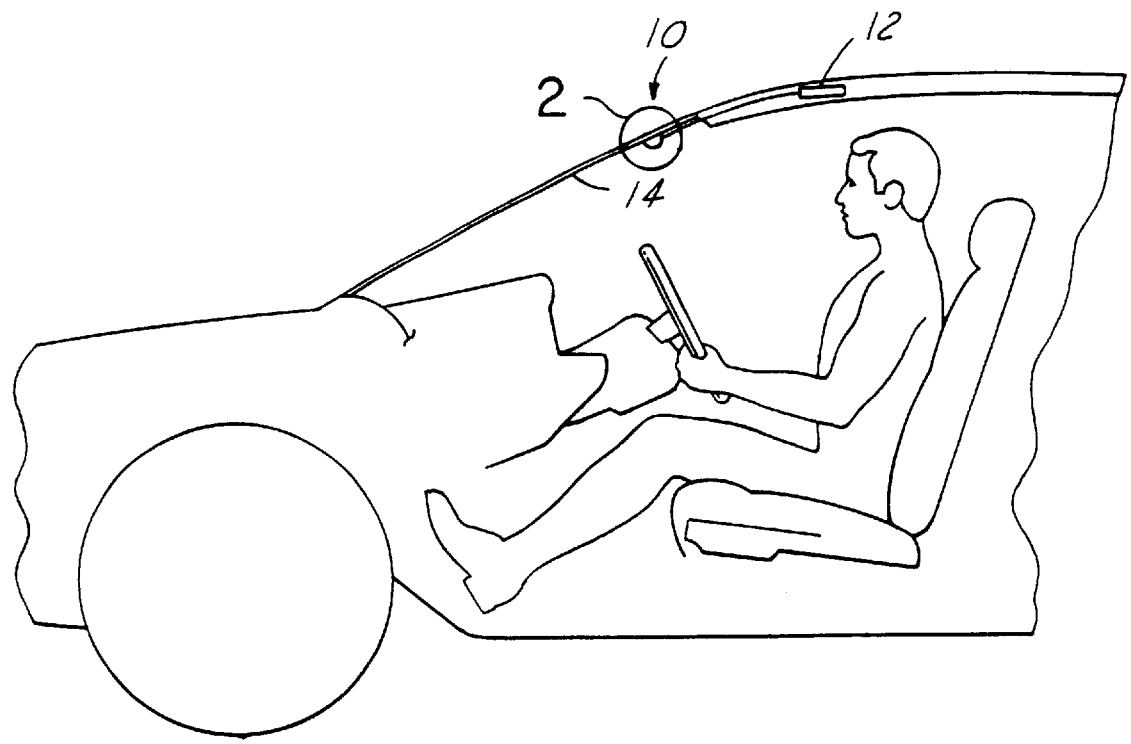
FIG. 1 shows a plan view of an integrated glass fog sensor unit mounted to the windshield of a vehicle.

Referring now to FIG. 1 of the drawings, an integrated glass fog sensor unit 10 communicates with a fog control unit 12. Unit 12 can be an integral part of a heating, ventilation, and air conditioning control system, HVAC, of a vehicle, wherein the unit 10 is adhered to a glass surface 14 of a windshield.

Figure 2:
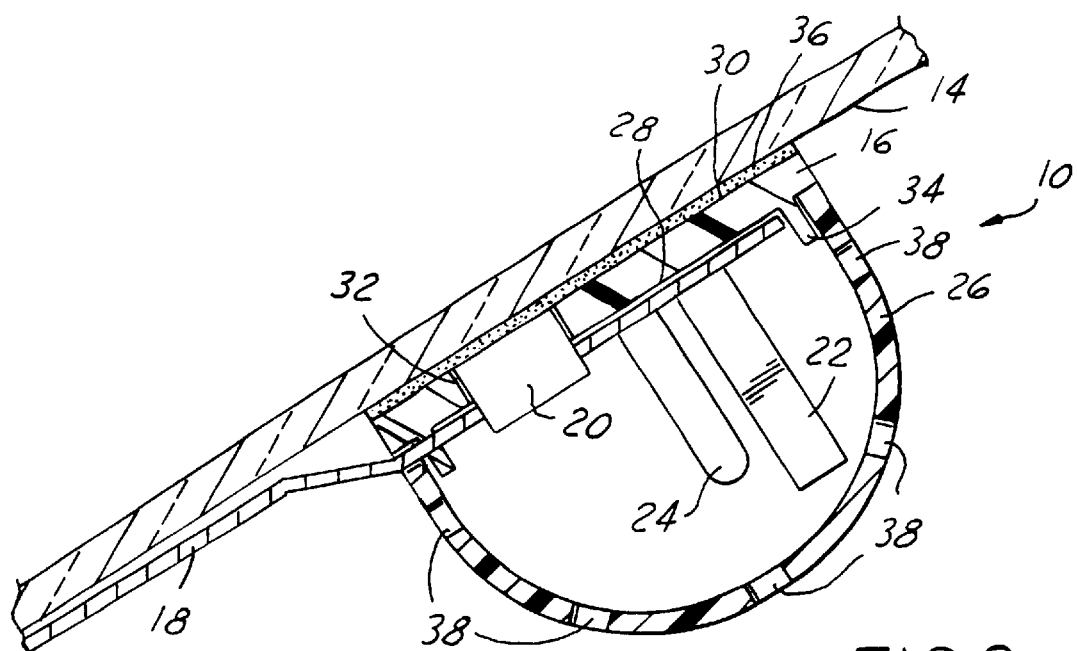
FIG. 2 shows a cross-sectional view of the integrated glass fog sensor unit.

Referring to FIG. 2, the unit 10 has a thermal barrier tray 16, a multi-conductor member 18, a glass temperature sensor 20, an ambient air temperature sensor 22, a relative humidity sensor 24, and a protective dome 26. The tray 16 has a top surface 28, a bottom surface 30, a hole 32 spanning through the surfaces 28 and 30, and a perimeter wall 34 substantially defining the surfaces 28 and 30. Bottom surface 30 has an adhesive layer 36 for securing the sensor 10 to glass surface 14. The glass temperature sensor 20 is in thermal contact with the glass surface 14 in order to measure the temperature at surface 14. The same adhesive layer 36 which secures the tray 16 can be used to secure sensor 20 to the surface 14. Ambient air temperature sensor 22 is located adjacent to the relative humidity sensor 24 and both are separated from surface 14 by the thermal barrier tray 16 and multi-conductor member 18. Tray 16 assures that surface 14 temperature does not alter the ambient air temperature or relative humidity levels at the sensor 22 and sensor 24 locations. The close proximity of ambient air temperature sensor 22 and humidity sensor 24 is necessary in order to calculate accurate dew-point values.

The protective dome 26 surrounds, and serves to protect, the sensors 20, 22 and 24 from any impacts, such as those created by occupants of a vehicle. Dome 26 has a plurality of apertures 38 of sufficient size and number so that the ambient air temperature sensor 22 and the relative humidity sensor 24 located within dome 26 are exposed to true ambient air temperature and humidity values within the immediate vicinity. Glass temperature sensor 20 and ambient air temperature sensor 22 are preferably thermistors.

Figure 3:
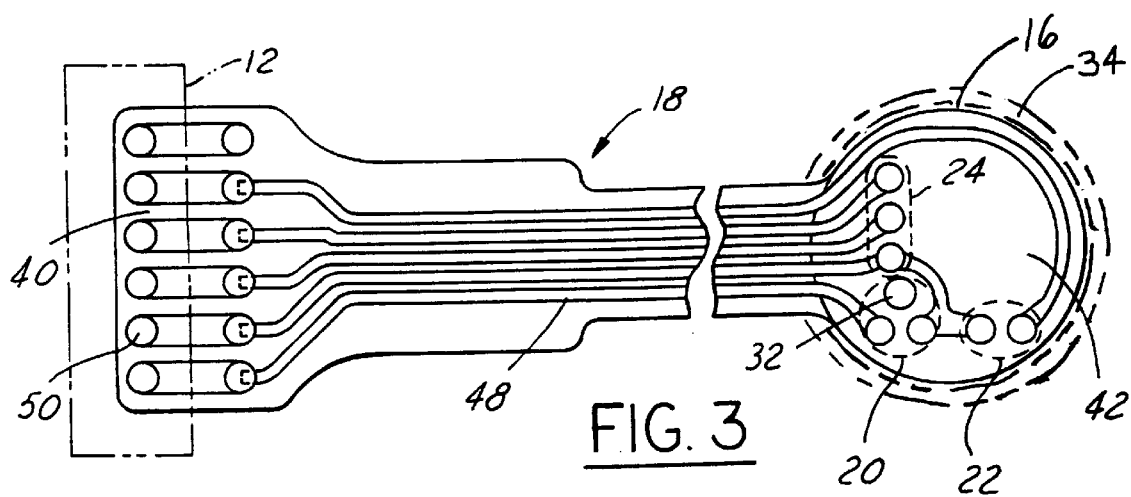
FIG. 3 shows a plan view of a multi-conduction member.

Referring to FIG. 3, multi-conductor member 18 is preferably embodied as a flex circuit. Member 18 comprises a conductor terminal end 40, a conductor sensor end 42, and a plurality of conductor strips 48 extending from end 40 to end 42. In order to complete the unit 10 circuit, the termination end 30 is pig-tailed into the fog control unit 12. Sensors 20, 22, and 24 are typically soldered to flex circuit end 42. The soldering secures sensors 20, 22, and 24 to the unit 10. In addition to securing sensor 24 to end 42 by soldering, end 42 is secured to the glass surface 14 by adhesive layer 36 through hole 32. The conductor sensor end 42 generally conforms to the perimeter wall 34, thereby securing the end 42 and soldered sensors 20, 22, and 24 to the tray 16. The plurality of conductor strips 48 include a common ground 50 which is shared by sensors 20, 22 and 24. Sensors 20, 22 and 24 are terminated at the conductor sensor end 42.

Figure 4:
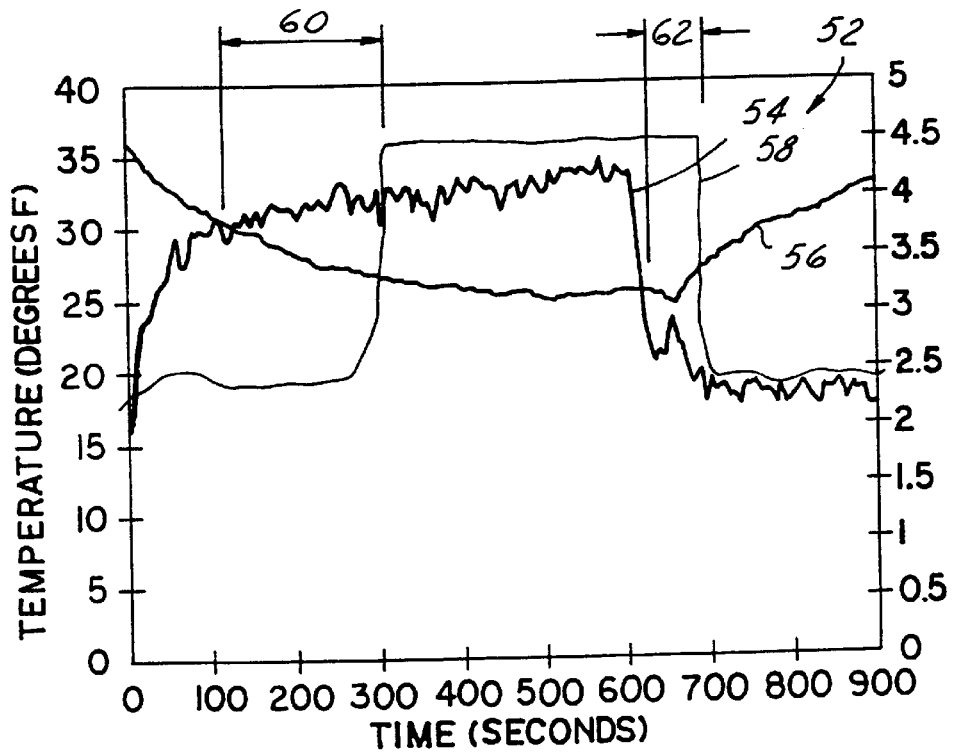
FIG. 4 is a fog prediction graph.

Referring to FIG. 4, a graph is shown of a fog prediction graph 52. Graph 52 has an ambient dew-point 54, a glass surface temperature 56 and an actual glass fogging 58. Unit 10 provides the glass surface temperature 56, and provides humidity and ambient temperature values for the calculation of the ambient dew point 54. If the ambient dew point 54 is greater than the glass surface temperature 56, the glass surface 14 is either fogged or will eventually fog. If the ambient dew-point 54 is below the glass surface temperature 56, the surface glass 14 is either clear or will eventually clear. This method can be used on any glass surface where unit 10 is located. The ambient air temperature sensor 22 is adjacent to the relative humidity sensor 24, or integrated therewith, so the response times between sensors 22 and 24 are substantially similar thereby providing accurate dew point calculations. The actual calculation is as follows:

$T$=Ambient Vehicle Cabin Temperature (degrees F.)

$RH$=Ambient Vehicle Cabin Relative Humidity (percent)

$DP$=Dew-point (degrees F.)

$T1=(T+459.688)/1.8$

So that if T1<273.16 then set:

$Z=273.16/T1$ $P1=-9.09718*(Z-1)$ $P2=-3.56654*\{[\log(Z)]/2.3025851\}$ $P3=0.876793*[1-(1/Z)]$ $P4=\log(0.0060273)/2.3025851$ $PWSC=29.921*[10\char`\^(P1+P2+P3+P4)]$ If T1=273.16 or T1>273.16 then set:

$Z=373.16/T1$ $P1=-7.90298*(Z-1)$ $P2=5.02808*\{[\log(Z)]/2.30258513\}$ $P3=-0.00000013816*\{10\char`\^[11.344*(1-(1/Z))]-1\}$ $P4=0.008132801*\{10\char`\^[(-3.49149*(Z-1))]-1\}$ $PWSC=29.921*[10\char`\^(P1+P2+P3+P4)]$ Where:

$PW=PWSC*RH$ $Q=\log(PW)$ $DP=79.047+30.579*Q+1.8893*Q\char`\^2$

So that if: DP>T1 then: DP=T1
And if: DP≤32 then:

$DP=71.98001+24.873*Q+0.8927*Q\char`\^2$

And if: DP>T1 then: DP=T1

The graph 52 further has a lead time 60 and a trail time 62. The lead time 60 is the difference in time between when the dew-point 54 transitions above the glass surface temperature 56 and the appearance of actual glass fogging 58. Lead time 60 occurs because additional energy needs to be removed for the state transition from vapor to liquid or solid. Therefore, on the graph 52 depicted, the lead time 60 is approximately 150 seconds, meaning that actual glass fogging 58 is predicted approximately 150 seconds prior to when fogging 58 actually occurs.

Conversely, trail time 62 is the difference in time between when the dew-point 54 transitions below the glass surface temperature 56 and the disappearance of actual glass fogging 58. Trail time 62 occurs because additional energy is required for the state transition from solid or liquid to vapor. Therefore, on the graph 52 depicted, the trail time 62 is approximately 70 seconds, meaning that actual glass fogging 58 is sustained for approximately 70 seconds after the parameters necessary to sustain fogging cease to exist.

While the forms of the invention herein disclosed constitute presently preferred embodiments, many others are possible. It is not intended herein to mention all of the possible equivalent forms or ramifications of the invention; it is understood that the terms used herein are merely descriptive rather than limiting and that various changes may be made without departing from the spirit or scope of the invention.

We claim:

1. An integrated glass fog sensor unit for adhering to a glass surface, the unit comprising:

a thermal barrier tray having a hole, a perimeter wall, a top surface, and a bottom surface, the hole extending through the top surface and the bottom surface, the top and bottom surfaces defined by the perimeter wall;

an adhesive layer secured to the bottom surface for adhering to the glass surface;

a multi-conductor member having a conductor terminal end, a conductor sensor end, and a plurality of conductors, the conductor sensor end disposed over the top surface, the conductors each extending from the conductor terminal end to the conductor sensor end, one of the conductors being a common ground;

a glass temperature sensor termed to the conductor sensor end, the glass temperature sensor within the hole and in communication with the glass surface;

an ambient air temperature sensor termed to the conductor sensor end, secured to the top surface;

a relative humidity sensor termed to the conductor sensor end, the humidity sensor secured to the top surface, the relative humidity sensor mounted adjacent to the ambient air temperature sensor, the common ground termed to the glass temperature sensor, the ambient air temperature sensor and the relative humidity sensor; and a protective dome having a plurality of apertures, the dome engaged to the perimeter wall, the dome covering the tray, the glass temperature sensor, the ambient air temperature sensor, the relative humidity sensor, and the conductor sensor end.

2. An integrated glass fog sensor unit according to claim 1, wherein the multi-conductor member is a flex circuit.

3. An integrated glass fog sensor unit according to claim 2, wherein the conductor sensor end conforms to the perimeter wall thereby holding the conductor sensor end in place.

4. An integrated glass fog sensor unit according to claim 1, wherein the conductor terminal end is in communication with a fog prevention control unit.

5. An integrated glass fog sensor unit according to claim 1, wherein the glass temperature sensor is a thermistor.

6. An integrated glass fog sensor unit according to claim 1, wherein the ambient air temperature sensor is a thermistor.

7. An integrated glass fog sensor unit according to claim 1, wherein the ambient air temperature sensor is integral to the relative humidity sensor.

8. An integrated glass fog sensor unit for use on an inner glass surface of an automotive windshield, comprising:

a thermal barrier tray having a hole and a perimeter wall;

an adhesive layer disposed between the glass surface and the tray;

a flex circuit comprising:
a conductor terminal end,
a conductor sensor end formed to the thermal barrier tray and defined by the perimeter wall, and
a plurality of conductor strips extending from the conductor terminal end to the conductor sensor end, one strip being a common ground;

a glass temperature sensor termed to the conductor sensor end, the glass temperature sensor within the hole and in functional contact with the glass surface, the glass temperature sensor being a thermistor;

an ambient air temperature sensor termed to the sensor end and secured to the tray, the ambient air temperature sensor being a thermistor;

a relative humidity sensor termed to the conductor sensor end and secured to the tray, the relative humidity sensor mounted adjacent to the ambient air temperature sensor, the common ground termed to the glass temperature sensor, the ambient air temperature sensor, and the relative humidity sensor; and a protective dome having a plurality of apertures, the dome engaged to the perimeter wall, the dome covering the tray, the glass temperature sensor, the ambient air temperature sensor, the relative humidity sensor, and the conductor sensor end.

9. An integrated glass fog sensor unit according to claim 8, wherein the ambient air temperature sensor is integral to the relative humidity sensor.

* * * * *